United States Patent [19]

Goulding et al.

[11] Patent Number: 4,624,880

[45] Date of Patent: Nov. 25, 1986

[54] SHAPED ARTICLE OF COMPOSITION COMPRISING THERMOPLASTIC SYNTHETIC RESIN AND CELLULAR MATERIAL AND METHOD OF PRODUCING SAME

[75] Inventors: Leslie B. Goulding, Old Orchard; Ian F. Johnson, Woking, both of England

[73] Assignee: James Walker & Co., Limited, Woking, United Kingdom

[21] Appl. No.: 713,574

[22] Filed: Mar. 18, 1985

[30] Foreign Application Priority Data

Mar. 21, 1984 [GB] United Kingdom ............... 8407311

[51] Int. Cl.$^4$ ...................... C08K 11/00; B32B 5/16
[52] U.S. Cl. .................................. 428/143; 428/220; 428/323; 428/326; 428/327; 428/335; 428/455; 524/16
[58] Field of Search .............. 428/326, 327, 323, 455, 428/335, 143, 220; 524/16

[56] References Cited

U.S. PATENT DOCUMENTS

| | | | |
|---|---|---|---|
| 4,042,543 | 8/1977 | Strickman et al. | 524/16 |
| 4,172,168 | 10/1979 | Klaffke et al. | 428/327 |
| 4,347,272 | 8/1972 | Schmidt | 428/332 |

FOREIGN PATENT DOCUMENTS

| | | |
|---|---|---|
| 1348682 | 2/1972 | United Kingdom . |
| 1522620 | 12/1974 | United Kingdom . |
| 2140448 | 11/1984 | United Kingdom . |

OTHER PUBLICATIONS

Derwent Abs. 06116 W/04 (Fr2223174) 11–1974 G. J. M. Cailleau.
Derwent Abs. 83-786456/41 (9–83) Daikin J58148723A.
Derwent Abs. 54533A/30 (J53070251) Hitachi KK (6–78).
Derwent Abs. 00849D/02 (FR2451350) Oliver T (11–1980).
Derwent Abs. 85-025793/05 (DD-213877A) 9–1984.

Primary Examiner—Herbert J. Lilling
Attorney, Agent, or Firm—Browdy and Neimark

[57] ABSTRACT

A rail pad or other shaped article in the form of a resiliently compressible extrudate having a textured surface and comprising particles or granules of cork or similar resiliently compressible cellular material substantially homogenously dispersed throughout a polymeric matrix of generally saturated thermoplastic synthetic resin, preferably ethylene/vinyl acetate copolymer, which has a stiffness modulus of not more than 1000 MPa and is extrudable under conditions at which the cellular material is not significantly degraded, the extrudate having a Poissons ratio less than that of the matrix. The article may be made by forming a hot dough of the matrix and cellular material, feeding the dough in heat-softened state to an extruder, extruding it under conditions which compress the cellular material but avoid any significant mechanical breakdown or denaturing thereof, and relieving the compression of the cellular material downstream of the die but before the matrix has cooled to a temperature which would prevent this.

15 Claims, 6 Drawing Figures

SHAPED ARTICLE OF COMPOSITION COMPRISING THERMOPLASTIC SYNTHETIC RESIN AND CELLULAR MATERIAL AND METHOD OF PRODUCING SAME

This invention relates to rail pads and other shaped articles from compositions comprising thermoplastic synthetic resin and cellular material, to the production of such articles by extrusion and to apparatus suitable for use in the production of said articles. While the invention will be described with particular reference to rail pads, it will be understood that the principles involved are not limited thereto and can be applied to other shaped products. Rail pads are employed for building resilience into the support of the rails in a railway permanent way. They may be located between rail and sleeper or baseplate, between baseplate and sleeper or other support (as in the case of a non-ballasted construction) and/or under the sleeper. They may be in the form of individual pads or continuous strip eg., for use with non-ballasted track with continuous rail support.

Such pads have to be resiliently compressible under axle loads of up to 30 tonnes or more and at rolling stock speeds of up to 250 kph or even higher, weather-resistant and abrasion-resistant. Their mechanical properties should not change significantly over a wide range of temperatures from as low as $-20°$ C. or lower to $+60°$ C. or even higher, and they must be able to provide a conformable interface between adjacent track members. Preferably they have a useful life that is not less than that of the rail itself, eg. 10-15 years, electrical insulating properties and a high coefficient of friction. Where, for example, they are intended for location directly under a rail, their mechanical characteristics should also be such that they do not deform under clip (or bolt) load and live load in such a way as to reduce significantly the clip toe load or bolt load.

One class of material that has found wide acceptance for the last two decades for moulding into rail pads comprises compositions of rubber and cork. However, because of the need to vulcanise these compositions after moulding, the pads are relatively expensive and research has continued for cheaper alternatives.

To this end, pads moulded from both high and low density polyethylenes have been tried but show a tendency to crack. More recently pads moulded from ethylene/vinyl acetate (EVA) copolymers have achieved some acceptance but it has been found that their mechanical properties are too temperature sensitive; they tend to become too stiff at low temperatures and at levels of vinyl acetate which give adequate performance at the elevated temperatures encountered during use, the pads tend to be insufficiently compressible because when loaded in compression between surfaces where friction is present the material cannot expand laterally. While this latter deficiency has been overcome to some extent by forming the pads with protuberances such as studs or ribs, or otherwise profiling them, this solution has had limited success because foreign particles such as wind blown particles and rust tend to collect in and around the protuberances and thus over time the benefit of the protuberances is lost.

The incorporation of cellular materials such as cork into these thermoplastic materials has hitherto been tried and rejected because under the conditions of temperature and pressure required to mould the compositions the cork is degraded (ie., denatured and/or mechanically broken down) and at the required moulding pressures either the cork is permanently compressed so that its resilient properties are reduced or lost, or if the mould pressure is released too soon in an attempt to avoid this, the mould shape is lost.

The search has therefore continued for alternative materials for use in the production of rail pads which are cheaper than the presently used rubber-cork composites but whose properties are better than the thermoplastic materials presently employed.

According to the present invention, there is provided a shaped article such as a rail pad comprising a resiliently compressible extrudate having a textured surface and comprising particles or granules of cork or other resiliently compressible cellular material substantially homogeneously dispersed throughout a polymeric matrix comprising a thermoplastic synthetic resin which is at least substantially saturated, said matrix having a stiffness modulus (100 sec modulus at 0.2% strain measured at 23° C.) of not more than 1000 MPa and being extrudable in the heat softened state under conditions, especially of temperature, at which the cellular material is not significantly degraded, and the extruded composition having a Poissons ratio which is less than, and preferably not more than 80% and most preferably not more than about half that of, the Poissons ratio of the matrix.

For use in the manufacture of rail pads, the extrudate is conveniently sheet material, and will usually have a thickness in the range of 3 to 15 mm. However larger or smaller thicknesses are not excluded.

Examples of suitable thermoplastic synthetic resins are low density polyethylenes, ethylene copolymers, eg. ethylene/propylene polymers, and plasticised vinyl chloride polymers. It will also be understood that the polymeric matrix may comprise a blend of two or more polymeric materials and that at least one of these may have a stiffness modulus above 1000 MPa provided that the value for the overall blend does not exceed that figure. The blend may include a minor amount of vulcanisable rubber, if desired, but this tends to increase the complexity and cost of manufacture due to the need for a vulcanisation step.

For the production of rail pads the stiffness modulus of the matrix is preferably about 25 to 200 MPa, more preferably 75 to 150 MPa. However lower values eg. down to 2 MPa or even lower may be desirable for some applications. Where the cellular material is cork, the preferred thermoplastic synthetic resins for the production of rail pads are polymers of ethylene and vinyl esters especially vinyl acetate and preferably containing 5 to 50% by weight vinyl acetate. The inclusion of vinyl acetate residues in the copolymer increases elastomeric properties and lowers the softening point. However, the improvement tends to be insignificant below 5% and while the lowering of the softening point which is achieved by increasing the vinyl acetate content lowers the temperature required for melt processing and therefore reduces the risk of degrading the cellular material, the performance of the rail pad at elevated temperatures tends to suffer at vinyl acetate contents above 50% by weight in the copolymer, unless the product is cross-linked. The preferred range for the production of rail pads is about 5 to 28% more preferably about 7 to 20% and most preferably about 10 to 15%, by weight. However higher or lower concentrations may be suitable for other applications and, if desired, one or more further comonomers may be included. Cross-linking may be effected by incorporating a free radical initiator such as a peroxide into the composition or by subjecting the extrudate to irradiation. However this increases the complexity and cost of production and is preferably avoided.

The size of the cork particles or granules also affects the properties of the composition; the smaller the particle the less its resilience and also the more thermoplast is required as a binder. For rail pads the preferred size range is about 0.3 to 2 mm preferably 0.5 to 1 mm but larger or smaller sizes may be appropriate for other applications. Cork particles obtained by attrition methods are particularly suitable, but other methods eg. stone grinding may be used. Below about 5 parts of cork per hundred parts of the matrix (5 phr), little improvement is obtained. As the cork content is increased the deflection under load increases but the composition tends to become more compressible and less resistant to abrasion and at levels above about 60 phr it becomes increasingly difficult to disperse the cork in the matrix. The preferred range is 10 to 50 phr and more preferably 10 to 25 phr for rail pads. While cork is much the preferred cellular material other cellular materials may be used which have levels of compressive strength and resilience similar to those of cork and the ability to be formed into compositions with thermoplastic materials and extruded.

The composition may include conventional additives such as heat and light stabilisers, processing aids, pigments, and plasticisers but, at least in the case of ethylene/vinyl acetate polymers, the presence of particulate filler, other than the cellular material, in any substantial amount, eg. 10 phr or more, tends to detract from the resilience of the material.

The method of forming the shaped article must be such as to avoid any significant degradation of the cellular material, eg. by denaturing or breaking down its structure, and also to avoid freezing it in the shaped composition in a substantially compressed state.

Thus, the normal techniques for producing shaped articles from thermoplastic compositions by compression or injection moulding are largely unacceptable.

In accordance with a further aspect of the present invention, there is provided a method of producing a resiliently compressible shaped article from a composition comprising a thermoplastic synthetic resin component which is at least substantially saturated and a resiliently compressible cellular material in particulate or granular form, the method comprising:

(a) forming a hot dough comprising a substantially homogeneous dispersion of the cellular material in a matrix comprising the synthetic resin component;

(b) feeding said dough with the matrix in the heat-softened state to a screw extruder;

(c) extruding said hot dough through a die under conditions at which there is no significant mechanical breakdown or denaturing of the cellular material but at least some compression thereof; and (d) causing or allowing the compression in the cellular material in the extrudate to be at least partly, and preferably substantially fully, relieved downstream of the die orifice before the synthetic resin component cools to a temperature which would prevent recovery of the cellular material from a compressed state.

The formation of the textured surface may be achieved by use of an appropriately profiled die surface, if desired, but adequate texturing will generally be obtained as a result of the relief of the compression in the cellular material.

One important feature of the process is that the composition of synthetic resin component and cellular material is fed to the screw extruder in a pre-heated dough-like form with the synthetic resin component in a heat softened state. It is possible that the dough could be formed in a pre-mixing stage in the extruder itself with choice of appropriate conditions but preferably it is formed by malaxation in a heavy duty internal mixer, preferably of the interlocking rotor type eg. a Shaw 'Intermix', where the mixing is effected under carefully controlled conditions of pressure, temperature, time and energy consumption in order to obtain a homogeneous mix without any significant denaturing or mechanical breakdown of the particles of cellular material. Denaturing of the particles may be detected by discoloration. Mechanical breakdowns is shown by fragmentation of the particles and a reduction in the compression achieved under a given load.

The dough so obtained is then fed hot to the extruder. The use of open mills tends to be unsuitable.

Another important feature is that the extruder screw design and extruder conditions are such that the compression to which the dough is subjected in the extruder barrel is not so high as to cause any significant denaturing and mechanical breakdown of the cellular material. Preferably the feed section of the extruder is so designed that a relatively large length of the total length of the screw in the extruder is exposed to the feed, e.g. at least 25–30% of the total length of the screw. It is also preferred that the screw exerts no significant compression; that is to say, there is substantially no tapering of the hub and substantially no decrease in pitch of the screw in the section of the screw extending between the feed section and the die, at least for the major portion of that part of the length of the screw. A further important feature of the process is that the temperature during extrusion is such as not to cause significant denaturing of the cellular material. Denaturing is a function of temperature and time; that is, at lower temperatures, longer processing times can be used and vice versa. However, processing times at any particular temperature can be extended if the processing is in an enclosed atmosphere. Where cork is employed, the processing temperature should not exceed about 120° C. to 125° C. where the composition is exposed to air but during processing in enclosed atmospheres temperatures as high as 200° C. may be tolerable for short periods. Because of the high coefficient of friction of cork, both the formation of the dough and its subsequent extrusion tend to generate heat and therefore any applied heat should be at a lower temperature and accurate temperature control is important. For the preferred compositions comprising ethylene/vinyl acetate copolymer and cork, it is preferred not to exceed about 120° C. and the most suitable temperature range is about 95°–115° C. in both the dough-forming and extrusion steps. However, the use of synthetic resins with higher softening points may necessitate somewhat higher temperatures e.g. up to 130° C. or even higher.

Yet another important feature is that the compression of the cellular material caused by the extrusion process is relieved at least partially, and preferably as fully as possible, before the synthetic resin material has cooled to a temperature at which any recovery of the compressed cellular material is prevented. In general it has been found that this is achievable by extruding the composition from the die into an atmosphere that is not below ambient temperature and where there is no forced draft. However, in some cases a heated atmosphere may be desirable and in others a slight surface cooling, e.g. of about 1°-2° C. may be needed to prevent the extrudate sticking to surfaces immediately downstream of the die. This may be achieved by blowing ambient air over the surface of the extrudate as it leaves the die. Where the process is employed to produce sheet material, the high surface coefficient of friction of the cellular material interferes with uniform distribution of the composition through a straight slit die having a high aspect ratio and it has therefore been found advantageous to use an arcuate die orifice. Preferably an annular die orifice is employed to form a tubular sheet extrudate which may thereafter be slit longitudinally to produce flat sheet from which shaped articles such as rail pads may be cut. By this means sheet up to 1.5 m wide or even wider can be produced.

The annular slot is preferably adjustable for thickness by means of a tapered nose cone which is axially adjustable relative to the die mouth. Preferably the slot thickness is adjusted to produce extrudate having a thickness of at least 1.5 mm, preferably 3 to 15 mm. Preferably the nose cone is supported externally since internal supports such as between the nose and the mouth of the die can produce undesired surface markings and/or even zones of weakness in the extrudate unless they are specially profiled or high extrusion pressures are used leading to undesirable mechanical breakdown of the cellular particles. The flat sheet obtained by slitting the annular extrudatemay be treated to remove any undesired surface imperfections and to improve uniformity of thickness without destroying the textured nature, eg. by passing through gauging rollers, before the temperature of the extrudate falls below the softening point of the synthetic resin. The product is thereafter cut into lengths and stacked. Apparatus suitable for producing flat sheet from a thermoplastic composition containing a component which has a high coefficient of friction may comprise an extruder having an annular die orifice for extruding tubular sheet, preferably at least 1.5 mm thick and more preferably 3 to 15 mm thick, and means downstream of the die for slitting the advancing extrudate longitudinally. The slitting means is suitably a knife edge located in the path of the extrudate. Where the extrudate is extruded horizontally and the knife is located at or near the 6 o'clock position, the apparatus may also require support and profiling means for supporting the advancing slit tube and opening it out into flat sheet. A gas cushion between the support and profiling means and the extrudate prevents sticking.

Preferably the thickness of the annular gap is adjustable. Suitably the die comprises a mouth and a tapered nose cone located in the mouth and mounted to be movable axially relative to the die mouth. It is important that the manner in which the nose cone is supported is sufficient to resist the extrusion pressure in the die and prevent any substantial movement of the nose during extrusion. Preferably, final adjustment of the nose cone for concentricity is effected after extrusion has commenced.

Means may be provided for measuring the thickness of the extrudate, together with means responsive to said measuring means for automatically adjusting the size of the annular gap to maintain the extrudate thickness between predetermined limits. The thickness may be measured directly or indirectly, eg. by weighing fixed lengths of the extrudate.

The apparatus may further include one or more of the following, namely means for forming a dough of thermo-plastic polymeric material and the component having a high coefficient of friction in a heated atmosphere and feeding it hot to the extruder, gauging means for removing any undesired imperfections from the face of the flat sheet and improving uniformity of thickness, preferably without destroying any texturing on the face, means for cooling the sheet downstream of the gauging means, and means for cutting the cooled sheet into lengths and stacking the lengths of cut sheet.

By means of the present invention, shaped articles can be produced from compositions comprising thermoplastic polymers and particles or granules of cellular material such as cork without any significant degradation of the cellular material and wherein the particles or granules of cellular material are not in a permanently compressed state. The shaped articles so obtained are resiliently compressible and can be produced with properties making them particularly suitable for use as rail pads. Such pads can be produced substantially cheaper than those made from rubber and cork, primarily because no vulcanisation step is required, and yet their properties such as deflection under load and variation of stiffness with temperature are substantially improved as compared with rail pads made from the thermoplastic materials employed hitherto as alternatives to rubber/cork compositions.

When sheets in accordance with this invention and containing even as much as about 15 to 20 parts of cork granules per 100 parts of the polymer matrix were flexed by hand, their apparent stiffness when flexed seemed to be little different from that of corresponding sheets made from the polymer matrix alone and substantially greater than that hitherto considered to be acceptable for materials which would be suitable for use in the production of rail pads. Accordingly, the discovery that their compressibility or deflection under load is substantially increased and that the Poissons ratio is substantially reduced, eg., from 0.5 to about 0.3 or 0.25, or even lower, was unexpected.

Particularly surprising was the discovery that rail pads manufactured from compositions comprising a thermoplastic resin and a cellular material such as cork in accordance with this invention were at least as compressible as pads manufactured from compositions containing the same amount of cork but with rubber as the matrix although pads from the rubber alone were more compressible than pads of the copolymer alone.

The textured surface of the shaped article is particularly important in rail pads since it assists the pad to conform with the surfaces constraining it when subjected to compression such as by a rail clip and also increases the surface coefficient of friction. However pads in which a profiled, e.g. ridged or ribbed, surface is superimposed on the textured surface are also included within the scope of the invention.

The invention will now be described in greater detail with reference to one embodiment thereof and with the aid of accompanying drawings in which.

Figure 1A:
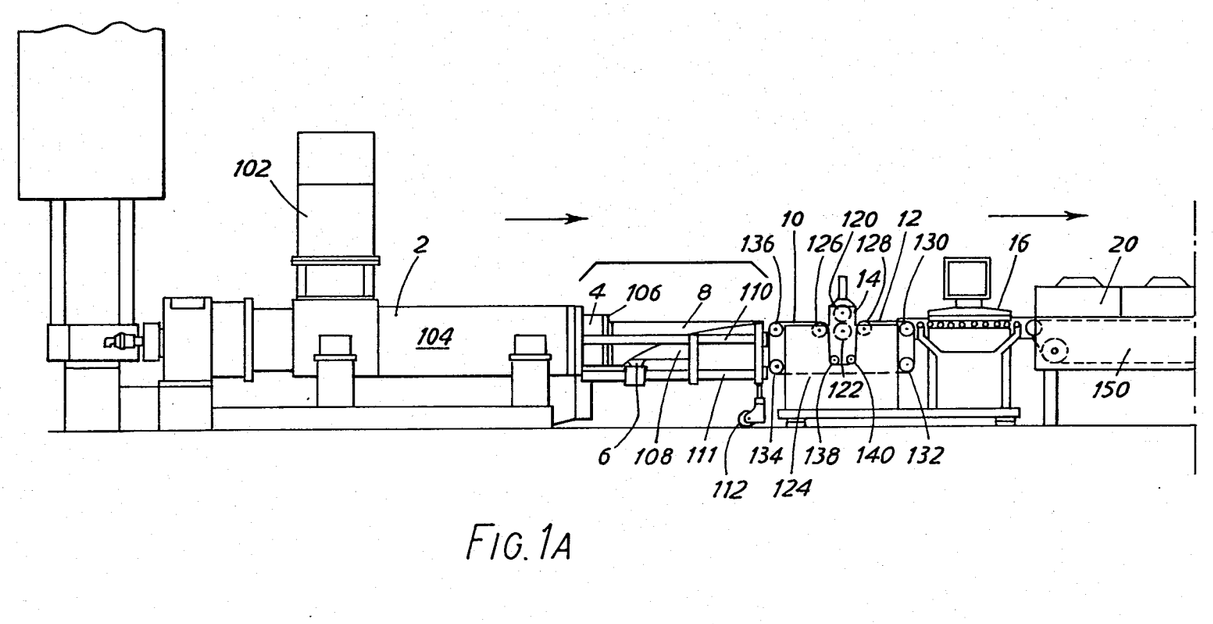
FIG. 1 is a general side elevation view, not necessary to scale, of a line for the production of flat sheetstock suitable for use in the production of rail pads from a composition of ethylene/vinyl acetate copolymer and cork. The Figure is split into FIGS. 1A and 1B.
Figure 1B:
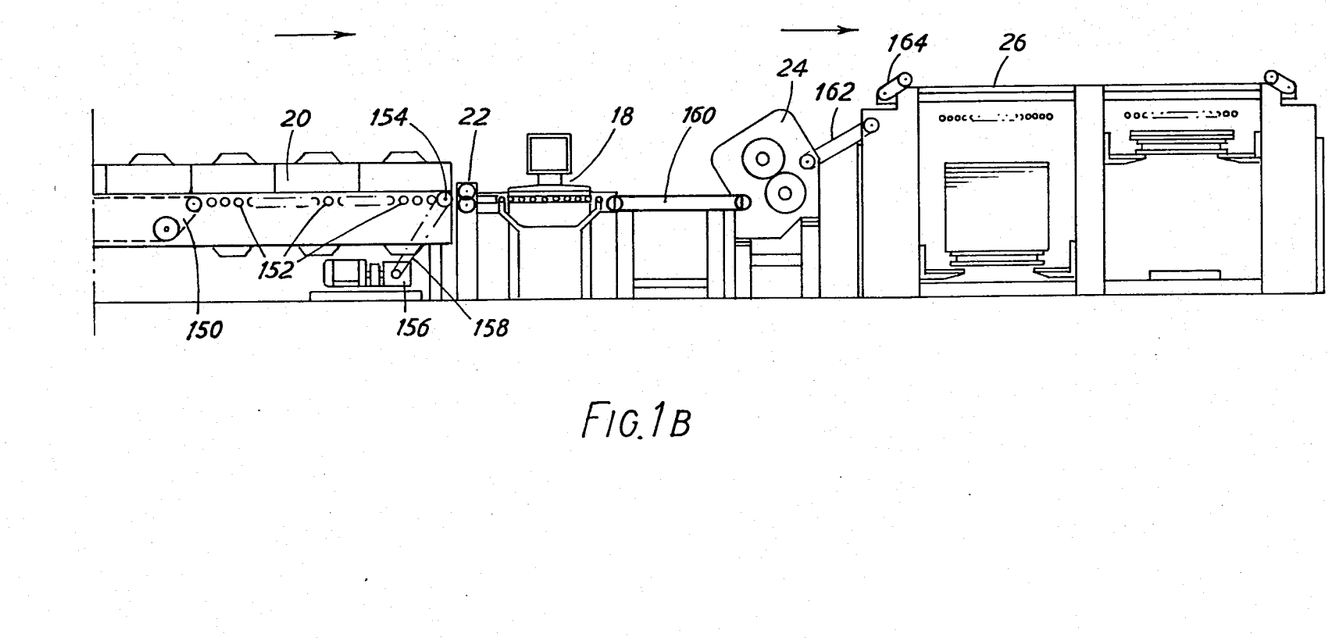

Referring to the FIG. 1, 2 is a screw extruder having an annular die 4, 6 is a fixed knife edge downstream of the die, 8 is a support member for the extrudate, 10 and 12 are conveyors, 14 is a gauging means, 16 and 18 are weigh conveyors, 20 is a cooling chamber, 22 is an edge trimmer, 24 is a cutter and 26 is a stacker. 98 parts by weight of an ethylene/vinyl acetate copolymer having a vinyl acetate content of 12.5% by weight, a melt flow index (BS 2782 105 C) of 4 dg/min, a density (BS 3412(D) 1976) of 0.931, a softening point (BS 2782 102 A) of 68° C. and a stiffness modulus (100 sec modulus at 0.2% strain and 23° C.) of 94 MPa, 4 parts by weight of a low molecular weight polyethylene carbon black masterbatch containing 50% by weight of carbon black and 15 parts by weight of granulated cork having a particle size in the range 0.5 mm to 1 mm and a bulk density of 60 kg/m$^3$ were metered to a Shaw 'Intermix' K4 MkIII internal mixer operating with a rotor speed of 33 rpm and ram pressure of 56 psig, and mixed for two minutes to form a dough having a batch weight of 48 kg approximately which is recovered at about 115° to 120° C.

The dough is then transferred while still hot to the hopper 102 of extruder 2 having a barrel diameter of 300 mm, the screw of which is a pure metering screw with uniform shaft diameter and flight pitch and an L:D ratio of 8:1. Screw and barrel temperatures were in the range of 40°–60° C., respectively, and the screw speed was in the range 15 to 30 rpm. The feed section formed about 30% of the total length of the screw.

The mix is advanced along the extruder barrel 104 through the feed and metering sections and then extruded through annular die 4 at a die temperature and pressure of 95° to 120° C. and 500–750 psig (about 34 to 51 Kg/cm$^2$) to produce tubular sheet having a nominal thickness of about 5.2 mm and an outer circumference of 1.3 m.

The die is formed by a mouth 106 and a tapering nose cone 108 which is supported on three rods, two of which, 110, are located one to each side of the cone and the third of which, 111, is located underneath. The cone is adustable axially relative to the die mouth to adjust the die gap. Adjustment is by combination of a hydraulic ram and pulse motor drive, not shown. The nose cone is mounted at the front end of an axially movable piston, the rear end of which is biassed into engagement against the forward end of a screwed rod which is screwed into a tapped collar whereby rotation of the collar relative to the screwed rod by means of the pulse motor drive advances or retracts said rod and hence the piston and the nose cone. The ram comprises a hollow shaft through which the nose cone piston extends and the forward end of which is engagable with the rear of the nose cone whereby in operation it can be moved forward to engage the nose cone and push it and its piston forward to relieve the screwed rod of the extrusion pressure during any adjustment. The mounting of the outside or mouth of the die includes means such as adjustment screws for centering it relative to the nose cone.

The tubular sheet is extruded into ambient air but no forced cooling is provided. The advancing extrudate is passed over fixed knife edge 6 and is thereby slit longitudinally as it moves forward and the slit tube is supported on and transformed into flat sheet as it advances over support member 8. In the embodiment illustrated, the knife edge is at about the 6 o'clock position relative to the extruded tube but it may also be, for example, at the 12 o'clock position.

The rate of extrusion is such that as the extrudate emerges from the die, the compression of the cork granules that occurs during extrusion is relieved before the ethylene/vinyl acetate polymer composition has cooled below its softening point thereby producing on the faces of the extrudate a textured surface which has a look and feel rather like that of a rough-skinned reptile.

The flattened slit tubular sheet is then advanced by conveyor 10 through the nip between rollers 120 and 122 of gauging means 14 in which the sheet is subjected to a small amount of compression and any undesirable protrusions are removed to provide improved thickness control.

The gauged sheet is then withdrawn by conveyor 12 which operates at the same linear velocity as conveyor 10. To this end, conveniently conveyors 10 and 12 are formed by a single endless belt 124 which passes over driving, tension and idler rollers 126, 128, 130, 132, 134, 136 and 140. From conveyor 12 the sheet is advanced to weigh conveyor 16 which may of conventional construction for continuously weighing a measured length of the advancing sheet. Suitably, the weigh conveyor 16 generates a signal proportional to the measured weight and includes means for comparing the signal with a signal of fixed value corresponding to the weight corresponding to the desired thickness of the sheet and means responsive to any difference in the signals is provided for automatically adjusting the axial location of the nose cone 108 relative to the mouth 106 of the extruder die 104 to maintain the thickness of the extrudate within predetermined limits. After the weigh conveyor 16, the sheet is passed through a cooling chamber 20, eg., by means of driven endless belt 150, and supported on idler rollers 152. In the chamber, the sheet is subjected to a cooling air stream, suitably at ambient temperature, to cool it below the softening point of the polymer. It is withdrawn from the chamber by roller 154 which is driven from motor 156 by driving belt 158 and advanced through an edge trimmer 22 where it is trimmed to a predetermined width in known manner. The trimmed sheet is then advanced over a further weigh conveyor 18 and thence by driven endless belt 160 to cutter 24 where the sheet is cut into predetermined lengths in known manner, the cut lengths being advanced by further driven endless belts 162, 164 to an automatic stacker 26.

In a second experiment, tubular sheet having the same nominal thickness and outer circumference as before was extruded from the same composition but using extruder screw and barrel temperatures both in the range 100°–120° C., an extruder screw speed in the range 8 to 15 rpm, a die temperature in the range 70° to 90° C. and a die pressure of 20–30 Kg/cm$^2$. The extruder and die assembly employed was basically the same as that used in the first experiment; however, the knife edge was at the 12 o'clock position and the support 8 for the extrudate was replaced by a flat continuous belt conveyor. Compressed air at ambient temperature was directed on to the inner face of the tubular extrudate just downstream of the die, between the mouth of the die and the knife edge, to prevent the slit extrudate sticking to surfaces immediately downstream of the die. The air was directed in the form of a number of radially inwardly directed jets from a distributor in the form of a hollow ring inside the extrudate and having holes spaced at regular intervals around its outer face, through which the compressed air was projected on to the extrudate. This air cooling is sufficient to cool the extrudate through 1°-2° C.

Rail pads having a nominal thickness of 5.2 mm were cut from the sheet formed in each of the two experiments. The pads had the following typical properties:

| PROPERTY | VALUE | | TEST METHOD |
|---|---|---|---|
| | Experiment 1 | Experiment 2 | |
| Tensile strength* | 53 Kg/cm² | 48 Kg/cm² | BS 903 Part A2 |
| Hardness (IRHD)* | 92° | 90° | BS 903 Part A26 |
| Density* | 0.76 g/cc | 0.80 g/cc | |
| Poissons ratio** | 0.25 | 0.31 | |
| Electrical Resistance: | | | |
| Initial | 6.0 × 10 69 ohms | 3 × 10" ohms | (BS 903 Part C2) Para 4.1 |
| After 48 hours immersion in water | 6.0 × 10⁷ ohms | 3 × 10" ohms | (Electrodes to BS 903 (Part C2) FIG. 1, (100 volts, DC) |

| | EXPERIMENT | |
|---|---|---|
| Abrasion Resistance:* | 1 | 2 |
| Tele dyne abraser Model 503 (3000 cycles) | Weight Loss: 0.39 g | 0.40 g |
| H22 abraser 1000 weight 70% vacuum | Thickness Loss: 0.22 mm | 0.19 mm |
| Compression Set:* | | |
| 25% compression 24 hours at 20 ± 3° C. 10 mins recovery | 20% | 11.6% |

*Measured on samples from which the textured finish had been removed from both sides of the sheet by buffing.
**The Poissons ratio of pads moulded from the copolymer alone was about 0.5

Load deflection characteristics were measured using a Mayes ESH 1000-4C servo hydraulic testing machine conforming generally to ISO 2856 on 170×148 mm×5.2 mm samples.

For static load deflection, 6 preconditioning cycles were completed from zero to 250 kN at 6 cycles/minute and the load deflection curve was then plotted from zero to 250 kN at 1200 kN/minute in an atmosphere at controlled temperature. The results were as follows.

| TEMPERATURE | | DEFLECTION FROM 'ZERO' TO 89 kN (mm) | DEFLECTION FROM 14 kN TO 89 kN (mm) | TANGENT STIFFNESS AT 89 kN (kN/mm) |
|---|---|---|---|---|
| −20° C. | Experiment 1 | 0.37 | 0.26 | 451 |
| | Experiment 2 | 0.23 | 0.15 | 740 |
| +20° C. | Experiment 1 | 0.69 | 0.49 | 229 |
| | Experiment 2 | 0.61 | 0.43 | 300 |
| +50° C. | Experiment 1 | 0.85 | 0.52 | 407 |
| | Experiment 2 | 0.83 | 0.55 | 320 |

Results for Dynamic deflection (sinusoidally at 5 Hz between 14 kN and 89 kN) are as follows:

| TEMPERATURE | Experiment | DEFLECTION | STIFFNESS | AREA WITHIN LOOP (N.m) |
|---|---|---|---|---|
| −20° C. | 1 | 0.088 mm | 928 | 1.1 |
| | 2 | 0.055 mm | 2700 | 0.7 |
| +20° C. | 1 | 0.17 mm | 520 | 2.6 |
| | 2 | 0.17 mm | 550 | 2.7 |
| +50° C. | 1 | 0.26 mm | 416 | 3.7 |
| | 2 | 0.27 mm | 450 | 3.8 |

The Deflection (mm) of each of the pads of Experiments 1 and 2 was plotted against Load (kN). The resultant curves are shown as curves (A) in FIGS. 2 and 3, respectively, of the accompanying drawings which, for the purposes of comparison, also show curves for (B) a prior art rail pad of rubber/cork composition and (C) a prior art rail pad moulded from ethylene/vinyl acetate copolymer.

Figure 2:
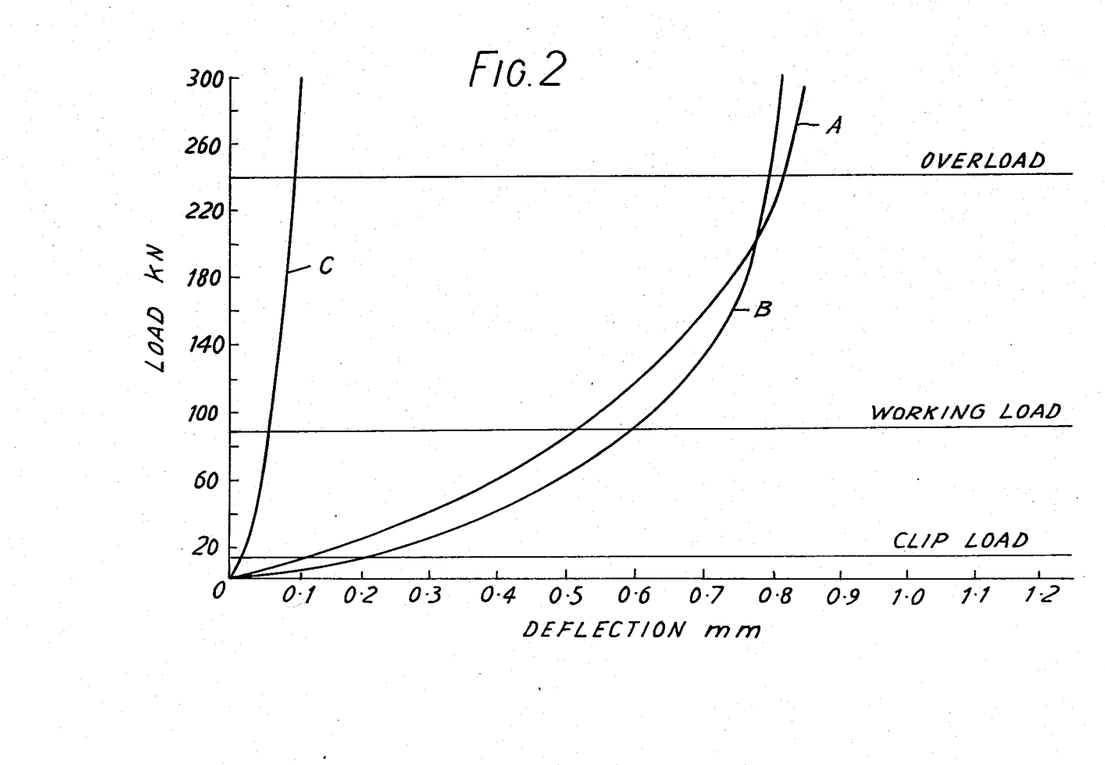
FIGS. 2 and 3 are graphs of Load v Deflection and in which curves are shown for rail pads in accordance with the invention and typical prior art pads.
Figure 3:
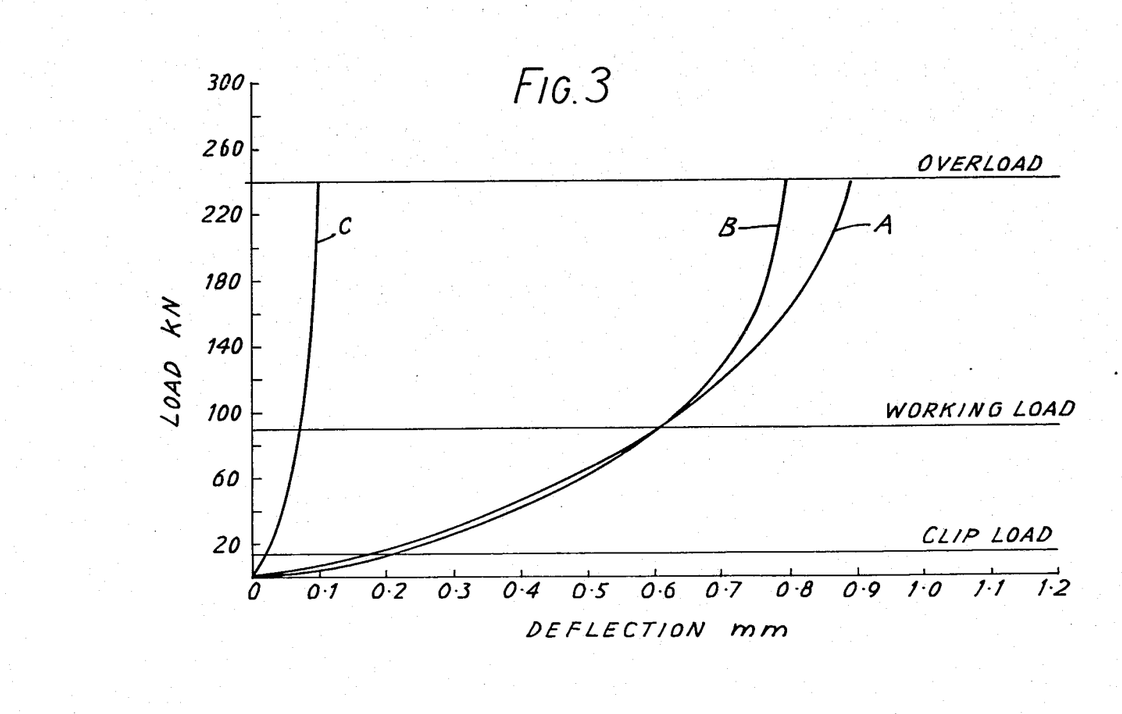

As can be seen in these Figures, the performance of the rail pad according to the present invention is marginally better than that of a rubber/cork composite rail pad, particularly in the important region of about 90 to 240 kN, and both are substantially better than that of an ethylene/vinyl acetate copolymer rail pad.

Figure 4:
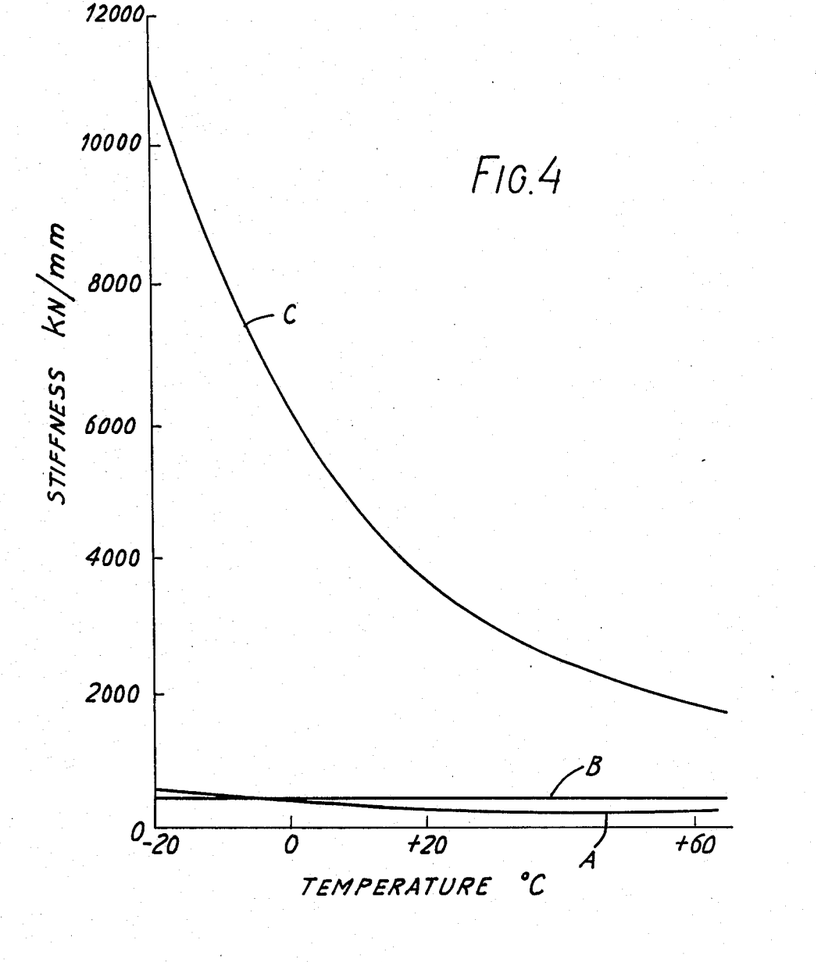
FIGS. 4 and 5 are graphs of Stiffness v Temperature showing curves for rail pads in accordance with the invention and typical prior art pads.

The Stiffness (kN/mm) of each the pads of Experiments 1 and 2 was plotted against Temperature (°C) and at a working load of 89 kN. The resultant curves are shown as curves (A) in FIGS. 4 and 5 respectively which also show the corresponding curves for rail pads moulded of rubber/cork composition (curve B) and for rail pads moulded from ethylene/vinyl acetate copolymer (curve C). As can be seen from FIG. 4, the stiffness of the rail paid of Experiment 1 varies hardly at all between −20° C. and +60° C. and its performance approaches that of the rubber/cork material (curve B) whereas the stiffness of the ethylene/vinyl acetate copolymer pad (curve C) at +60° C. is only about one fifth of its value at −20° C.

Figure 5:
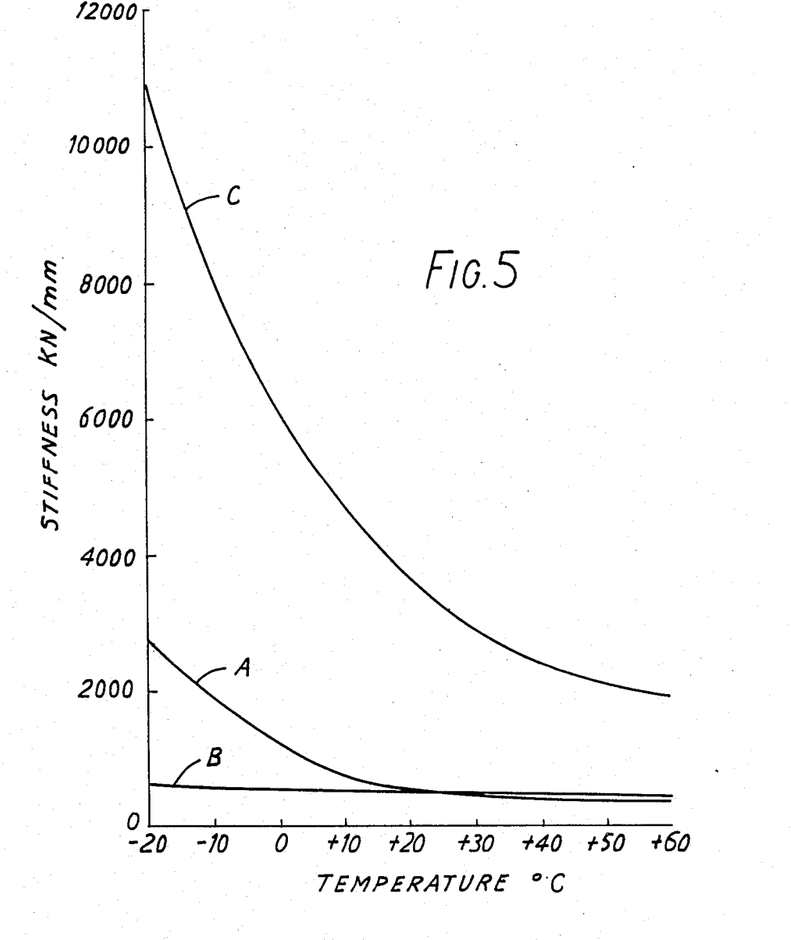

The stiffness of the rail pad of Experiment 2 reduces from 2700 kN/mm at −20° C. to 450 kN/mm at +50° C. a difference of 2250 kN/mm. That of the ethylene/vinyl acetate copolymer pad (curve B) however decreases from 10,800 kN/mm at −20° C. to 2000 kN/mm at +50° C. a difference of 8,800 kN/mm. Thus, the variation in stiffness of the rail pad of the present invention with temperature is much less than that of the pad of ethylene/vinyl acetate copolymer and is much closer to that of a conventional rubber/cork rail pad.

We claim:

1. A shaped article extruded from a heat softened composition comprising resiliently compressible cellular material in the form of particles or granules having a particle size in the range of about 0.3 mm to 2 mm and a polymeric matrix, said cellular material being present in an amount of at least 5 parts per 100 parts of polymeric matrix, by weight, said article comprising particles or granules of said cellular material in substantially undegraded form substantially uniformly dispersed throughout a substantially continuous phase comprising said polymeric matrix and having a textured surface resulting from at least partial relief of the compression of said cellular material caused by the extrusion process, and said polymeric matrix comprising a thermoplastic synthetic resin which is at least substantially saturated, said matrix having a stiffness modulus of not more than 1000 MPa and being extrudable in the heat-softened state under conditions, at which the cellular material is not significantly degraded, and the extruded composition having a Poissons ratio which is less than the Poissons ratio of the matrix.

2. A shaped article as claimed in claim 1 which is a rail pad formed form extruded sheet.

3. A shaped article as claimed in claim 2 which is from 3 to 15 mm thick.

4. A shaped article as claimed in claim 2 wherein the matrix has a stiffness in the range of from 25 to 250 MPa.

5. A shaped article as claimed in claim 2 wherein the matrix has a stiffness in the range of from 75 to 150 MPa.

6. A shaped article as claimed in claim 2 wherein the matrix comprises ethylene/vinyl acetate copolymer containing 5 to 50% vinyl acetate by weight.

7. A shaped article as claimed in claim 6 in which the copolymer contains 5 to 28% vinyl acetate by weight.

8. A shaped article as claimed in claim 6 in which the copolymer contains 7 to 20% vinyl acetate by weight.

9. A shaped article as claimed in claim 6 in which the copolymer contains 10 to 15% vinyl acetate by weight.

10. A shaped article as claimed in claim 2 wherein the cellular material comprises cork.

11. A shaped article as claimed in claim 10 wherein the cork is in the form of particles in the range of 0.5 to 1 mm in size.

12. A shaped article as claimed in claim 10 in which the cork is present in an amount of 5 to 60 parts per hundred of the matrix, by weight.

13. A shaped article as claimed in claim 10 in which the cork is present in an amount of 10 to 50 parts per hundred of the matrix, by weight.

14. A shaped article as claimed in claim 10 in which the cork is present in an amount of 10 to 25 parts per hundred of the matrix, by weight.

15. The shaped article of claim 1, wherein said cellular material has a Poissons ratio of no more than half that of the Poissons ratio of the matrix.

* * * * *